US011172052B2

(12) United States Patent
Ramos Chaves et al.

(10) Patent No.: US 11,172,052 B2
(45) Date of Patent: Nov. 9, 2021

(54) MERGING STORAGE PROTOCOLS

(71) Applicant: International Business Machines Corporation, Armonk, NY (US)

(72) Inventors: Jose Daniel Ramos Chaves, Heredia (CR); Ricardo Golcher Ugalde, San Jose (CR); Daniel Alberto Acon Davila, Heredia (CR); Pablo Francisco Barquero Garro, San Antonio de Coronado (CR); Meller Javier Perez Nunez, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 16/130,840

(22) Filed: Sep. 13, 2018

(65) Prior Publication Data

US 2020/0092399 A1  Mar. 19, 2020

(51) Int. Cl.
*H04L 29/06* (2006.01)
*H04L 12/24* (2006.01)
*H04L 29/08* (2006.01)

(52) U.S. Cl.
CPC .......... *H04L 69/08* (2013.01); *H04L 41/0893* (2013.01); *H04L 67/1097* (2013.01); *H04L 69/18* (2013.01)

(58) Field of Classification Search
CPC . H04L 69/08; H04L 41/0893; H04L 67/1097; H04L 69/18; H04L 67/10; G06F 3/0683; G06F 3/067; G06F 3/0661; G06F 3/0646; G06F 3/0601
See application file for complete search history.

(56) References Cited

U.S. PATENT DOCUMENTS

| 7,055,014 | B1 | 5/2006 | Pawlowski et al. |
| 7,069,307 | B1 | 6/2006 | Lee et al. |
| 7,398,326 | B2 | 7/2008 | Baldwin et al. |
| 7,523,286 | B2 | 4/2009 | Ramany et al. |
| 7,873,700 | B2 | 1/2011 | Pawlowski et al. |
| 8,019,849 | B1 | 9/2011 | Lopilato et al. |
| 9,240,985 | B1 * | 1/2016 | Potakamuri ......... G06F 21/6272 |
| 2003/0115303 | A1 * | 6/2003 | Marian ............... H04L 29/1232 709/222 |
| 2005/0066045 | A1 | 3/2005 | Johnson et al. |
| 2005/0262268 | A1 * | 11/2005 | Furukawa ............... H04L 45/60 709/245 |

(Continued)

OTHER PUBLICATIONS

Henry Yang, "Fibre Channel and IP San Integration", CiteSeer, 2004, pp. 1-15.

(Continued)

*Primary Examiner* — Yves Dalencourt
*Assistant Examiner* — Kamal Hossain
(74) *Attorney, Agent, or Firm* — Kunzler Bean & Adamson (57) ABSTRACT

Methods that can merge storage network protocols and/or system protocols are provided. One method includes assigning a unique identifier to each of a plurality of nodes in a storage network in which at least two nodes of the plurality of nodes implement a different storage protocol. The method further includes utilizing the unique identifier of the at least two nodes of the plurality of nodes to enable the at least two nodes to communicate with each other. Systems and apparatus that can include, perform, and/or implement the methods are also provided.

20 Claims, 8 Drawing Sheets

(56) References Cited

U.S. PATENT DOCUMENTS

| | | | |
|---|---|---|---|
| 2010/0011114 A1* | 1/2010 | Thomas | H04L 12/4625 |
| | | | 709/230 |
| 2011/0276713 A1* | 11/2011 | Brand | H04L 69/04 |
| | | | 709/232 |
| 2014/0226652 A1* | 8/2014 | Rao | H04L 45/04 |
| | | | 370/351 |
| 2019/0356609 A1* | 11/2019 | Grunwald | G06F 3/0614 |

OTHER PUBLICATIONS

"Integrating iSCSI and FC storage", SearchStorage.com, Feb. 10, 2007, pp. 1-7.

ExtremeTech Staff, "iSCSI and Fibre Channel Integration Scenarios", https://www.extremetech.com/extreme/72760-iscsi-and-fibre-channel-integration-scenarios#disqus_thread, ExtremeTech, Jan. 28, 2002, pp. 1-5.

* cited by examiner

MERGING STORAGE PROTOCOLS

FIELD

The subject matter disclosed herein relates to storage networks and systems and, more particularly, relates to apparatus, systems, and methods that can merge protocols for storage networks and/or storage systems.

BACKGROUND

Conventional storage environments are typically defined by the type of interface that is utilized to build a storage network. Example storage network types can include, among other examples, a Fibre Channel (FC) that uses FC world-wide node names or an Internet Small Computer System Interface (iSCSI) that uses iSCSI qualified names. In these type of storage networks, zoning can behave as an access control list that segments data access between node and storage arrays.

While FC networks and iSCSI networks are both effective at storing data, they are not compatible with one another. In fact, FC networks and iSCSI may be considered mutually exclusive of one another in that a network using an FC protocol cannot be combined with and/or communicate with a network employing an iSCSI protocol. As such, issues can arise when an FC network and an iSCSI network need to be merged, combined, and/or communicate with one another.

BRIEF SUMMARY

Methods, systems, and apparatus that can merge protocols for storage networks and/or systems are provided. One method includes assigning, by a processor, a unique identifier to each of a plurality of nodes in a storage network, wherein at least two nodes of the plurality of nodes implement a different storage protocol and utilizing the unique identifier of the at least two nodes of the plurality of nodes to enable the at least two nodes to communicate with each other.

A system includes a plurality of nodes in which at least a first node and a second node implement different storage protocols and a concentrator coupled to the plurality of nodes. In various embodiments, the concentrator includes an identifier module that assigns a unique identifier to the plurality of nodes and a block module that utilizes the unique identifier of the plurality of nodes to enable the first node and the second node to communicate with each other.

One apparatus includes an identifier module that assigns a unique identifier to each of a plurality of nodes in a storage network and a block module that utilizes the unique identifier of each node to enable a plurality of nodes, each implementing a different storage protocol, to communicate with each other. In various embodiments, at least a portion of these modules includes a set of hardware circuits, a set of programmable hardware devices, and/or executable code stored on a set of non-transitory computer-readable storage mediums.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

Figure 1:
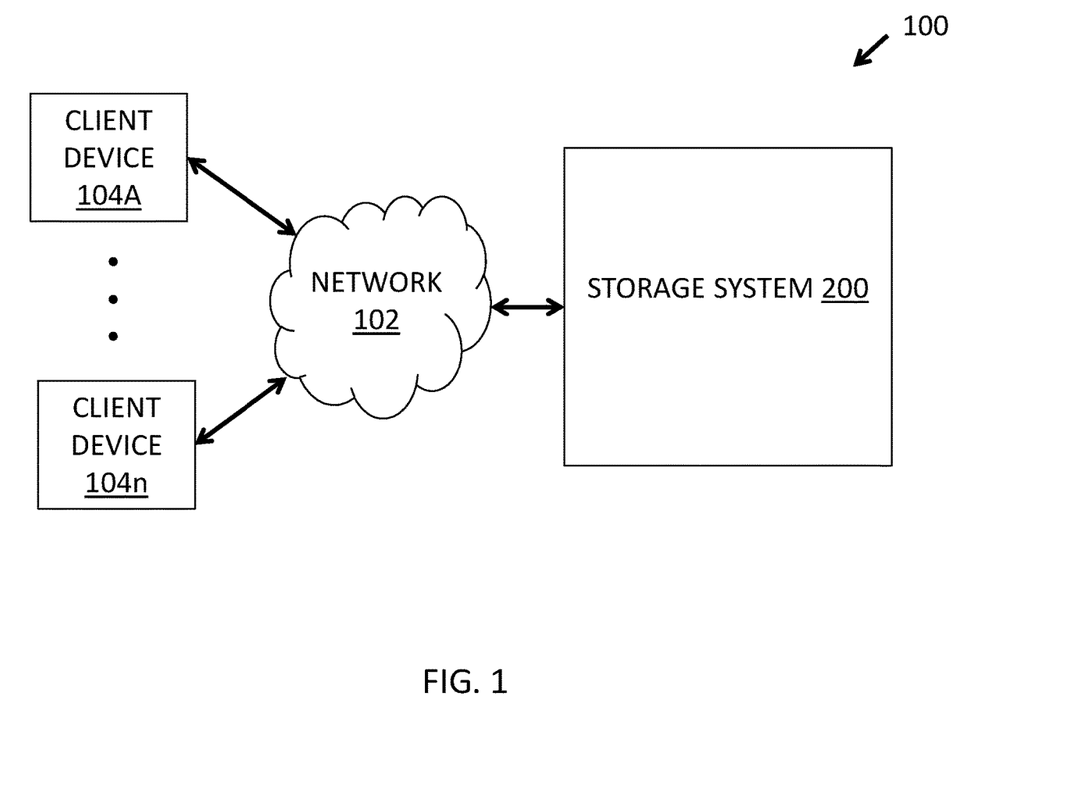
FIG. 1 is a block diagram of one embodiment of a storage network.

With reference now to the drawings, FIG. 1 is a block diagram of one embodiment of a storage network 100 (or system) including a network 102 connecting a set of client devices 104A through 104n and a storage system 200. The network 102 may be any suitable wired and/or wireless network 102 (e.g., public and/or private computer networks in any number and/or configuration (e.g., the Internet, an intranet, a cloud network, etc.)) that is known or developed in the future that enables the set of client devices 104 and the storage system 200 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 200 to write data, read data, and/or modify data. Specifically, each client device 104 can transmit 110 requests to read, write, store, communicate, propagate, and/or transport instructions, data, computer programs, software, code, routines, etc., to the storage system 200 and may comprise at least a portion of a client-server model. In general, the storage system 200 can be accessed by the client device(s) 104 and/or communication with the storage system 200 can be initiated by the client device(s) 104 through a network socket (not shown) utilizing one or more inter-process networking techniques.

Figure 2:
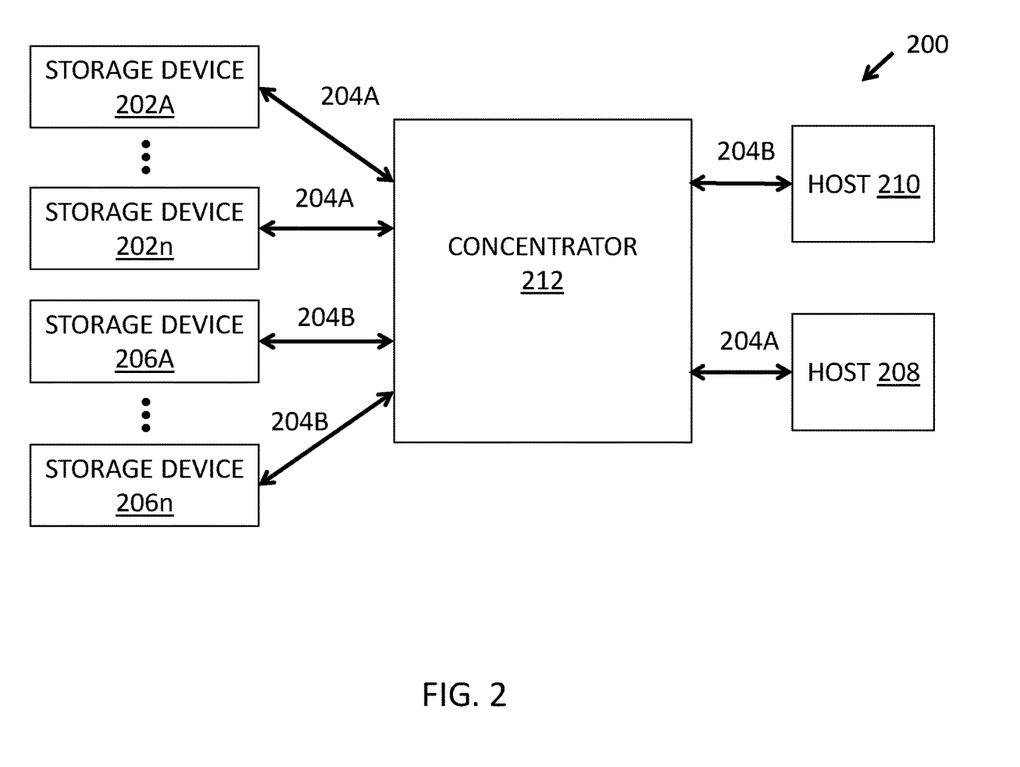
FIG. 2 is a block diagram of one embodiment of a storage system included in the storage network of FIG. 1.

Referring to FIG. 2, Figure is a block diagram of one embodiment of the storage system 200 illustrated in and discussed with reference to FIG. 1. The storage system 200, at least in the illustrated embodiment, includes, among other components, a set of storage devices 202A through 202n implementing a communication protocol 204A, a set of storage devices 206A through 206n implementing a communication protocol 204B, a host 208 implementing the communication protocol 204A, and a host 210 implementing the communication protocol 204B coupled to and enabled to communicate with one another via a concentrator 212.

The storage devices 202A through 202n (also simply referred individually, in various groups, or collectively as storage device(s) 202) may be any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

The storage devices 206A through 206n (also simply referred individually, in various groups, or collectively as storage device(s) 206) may be any suitable type of device and/or system that is known or developed in the future that can store computer-useable data. In various embodiments, a storage device 206 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A host 208 (or host device 208) may include any suitable computer hardware and/or software that is known or developed in the future that can provide host operations. In various embodiments, a host 208 can include one or more processors, computer-readable memory, and/or one or more interfaces, among other features and/or hardware. A host 208 can further include any suitable software component or module, or computing device(s) that is/are capable of hosting and/or serving a software application or services, including distributed, enterprise, and/or cloud-based software applications, data, and services. For instance, a host 208 can be configured to host, serve, or otherwise manage data sets, or applications interfacing, coordinating with, or dependent on or used by other services, including transportation service applications and software tools. In some instances, a host 208 can be implemented as some combination of devices that can comprise a common computing system, server, server pool, or cloud computing environment and share computing resources, including shared memory, processors, and interfaces.

A host 210 (or host device 210) may include any suitable computer hardware and/or software that is known or developed in the future that can provide host operations. In various embodiments, a host 210 can include one or more processors, computer-readable memory, and/or one or more interfaces, among other features and/or hardware. A host 210 can further include any suitable software component or module, or computing device(s) that is/are capable of hosting and/or serving a software application or services, including distributed, enterprise, and/or cloud-based software applications, data, and services. For instance, a host 210 can be configured to host, serve, or otherwise manage data sets, or applications interfacing, coordinating with, or dependent on or used by other services, including transportation service applications and software tools. In some instances, a host 210 can be implemented as some combination of devices that can comprise a common computing system, server, server pool, or cloud computing environment and share computing resources, including shared memory, processors, and interfaces.

As discussed above, the storage device(s) 202, storage device(s) 206, host 208, and host 210 implement the communication protocol 204A or communication protocol 204B (also simply referred individually, in various groups, or collectively as communication protocol(s) 204). A communication protocol 204 may be any suitable type of communication protocol that enables the storage devices 202 to communicate with one or more other nodes and/or components (e.g., a host device, a storage devices, etc.). Example communication protocols includes, but are not limited to, Advanced Technology Attachment (ATA), Serial ATA (SATA), Fibre Channel (FC), Small Computer System Interface (SCSI), Internet SCSI, (iSCSI), Serial Attached SCSI (SAS), ATA over Ethernet (AoE), FC over Ethernet (FCoE), Enterprise Systems Connection over FC (FICON), Hyper-SCSI, Internet FC (iFC), and iSCSI Extensions for Remote Direct Memory Access (iSER), among other communication protocols that are possible and contemplated herein.

In various embodiments, the communication protocol 204A and communication protocol 204B are different communication protocols. For example, the communication protocol 204A (e.g., the communication protocol utilized by storage device(s) 202 and host 208 in the illustrated embodiment) may include an FC protocol, among other communication protocols that are possible and contemplated herein, while the communication protocol 204B (e.g., the communication protocol utilized by storage device(s) 206 and host 210 in the illustrated embodiment) may include an iSCSI protocol, among other communication protocols that are possible and contemplated herein provided that communication protocols 204A and 204B are different communication protocols.

So that storage device(s) 202 and 206 and hosts 208 and 210 implementing different communication protocols are able to communicate with one another, storage system 100 includes concentrator 212. A concentrator 212 can include any suitable hardware and/or software that can allow computing nodes (e.g., storage device(s) 202, storage device(s) 206, host 208, and host 210, etc.) implementing different communication protocols (e.g., communication protocol 204A and communication protocol 204B, etc.) to communicate and/or share resources with one another, as set forth herein.

Figure 3:
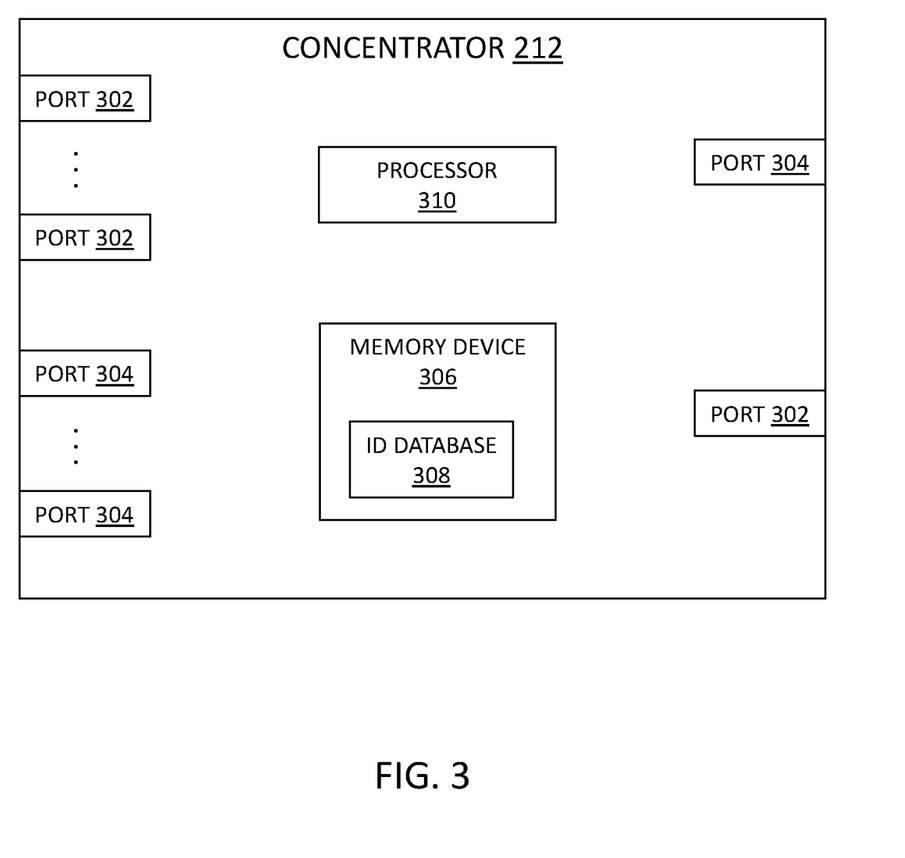
FIG. 3 is a block diagram of one embodiment of a concentrator included in the storage system of FIG. 2.

Referring to FIG. 3, Figure is a block diagram of one embodiment of a concentrator 212. At least in the illustrated embodiment, a concentrator 212 includes, among other components, a set of ports 302 compatible with the communication protocol 204A, a set of ports 304 compatible with the communication protocol 204B, a memory device 306 configured to include an identifier (ID) database 308, and a processor 310 coupled to and/or in communication with the port(s) 302, port(s) 304, and memory device 306.

A port 302 (also simply referred individually, in various groups, or collectively as port(s) 302) may include any hardware and/or software that is known or developed in the future that allows and/or facilitates a concentrator 212 to communicate, exchange, and/or share resources with a computing component or node (e.g., e.g., storage device(s) 202, storage device(s) 206, host 208, and host 210, etc.). In various embodiments, port(s) 302 are configured to implement and/or be compatible with one or more of the communication protocols discussed elsewhere herein. At least in the illustrated embodiment, ports 302 are configured to implement and/or be compatible with the communication protocol 204A (e.g., FC protocol), among other communication protocols that are possible and contemplated herein.

Further, each port 302 may be automatically (e.g., by a processor 310) or manually (e.g., by a user) assigned a different port identifier (ID). In some embodiments, a computing component or node (e.g., e.g., storage device(s) 202, storage device(s) 206, host 208, and host 210, etc.) coupled to a port 302 may be associated with the port ID to which it is coupled, which port ID can be utilized as a unique identifier to facilitate communication between computing components and/or nodes implementing different communication protocols that are coupled to concentrator 212 via a port 302 (or port 304), as discussed elsewhere herein.

While the concentrator 212 illustrated in FIG. 3 is shown as including three (3) ports 302, the various embodiments of a concentrator 212 are not limited to such quantity. That is, other embodiments of a concentrator 212 may include a single port 302, a pair of ports 302, or any suitable quantity of ports 302 greater than three.

A port 304 (also simply referred individually, in various groups, or collectively as port(s) 304) may include any hardware and/or software that is known or developed in the future that allows and/or facilitates a concentrator 212 to communicate, exchange, and/or share resources with a computing component or node (e.g., e.g., storage device(s) 202, storage device(s) 206, host 208, and host 210, etc.). In various embodiments, port(s) 304 are configured to implement and/or be compatible with one or more of the communication protocols discussed elsewhere herein that is different from the communication protocol 204A. At least in the illustrated embodiment, ports 304 are configured to implement and/or be compatible with the communication protocol 204B (e.g., iSCSI protocol), among other communication protocols that are possible and contemplated herein.

In addition, each port 304 may be automatically (e.g., by processor 310) or manually (e.g., by a user) assigned a different port identifier (ID). In some embodiments, a computing component or node (e.g., e.g., storage device(s) 202, storage device(s) 206, host 208, and host 210, etc.) coupled to a port 304 may be associated with the port ID (e.g., a unique identifier) to which it is coupled, which port ID can be utilized as a unique identifier to facilitate communication between computing components and/or nodes implementing different communication protocols that are coupled to concentrator 212 via a port 302 or port 304, as discussed elsewhere herein.

While the concentrator 212 illustrated in FIG. 3 is shown as including three ports 304, the various embodiments of a concentrator 212 are not limited to such quantity. That is, other embodiments of a concentrator 212 may include a single port 304, a pair of ports 304, or any suitable quantity of ports 304 greater than three.

As discussed above, a computing component or node (e.g., storage device(s) 202, storage device(s) 206, host 208, and host 210, etc.) may be assigned and/or associated with a port ID of the port (e.g., port 302 or port 304) to which the node is coupled to facilitate communication between computing components and/or nodes implementing different communication protocols that are coupled to a concentrator 212. In additional or alternative embodiments, a computing component or node (e.g., storage device(s) 202, storage device(s) 206, host 208, and host 210, etc.) may be automatically (e.g., by a processor 310) or manually (e.g., by a user) assigned a unique identifier (ID) that can be utilized to facilitate communication between computing components and/or nodes implementing different communication protocols that are coupled to a concentrator 212, as discussed in greater detail elsewhere herein.

A memory device 306 may include any suitable type of memory device and/or storage device including hardware and/or software that is known or developed in the future and is capable of storing data. In various embodiments, a memory device 306 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In various embodiments, a memory device 306 can be implemented as flash memory (e.g., a solid-state devices (SSD) or other non-volatile storage devices that store persistent data). Further, a memory device 306, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc. At least in the illustrated embodiment, a memory device 306 can be configured to store and/or manage an identifier (ID) database 308.

An ID database 308 may include any suitable hardware and/or software that is capable of storing the port ID of each port 302 and/or port 304 and/or the unique ID of each computing component or node (e.g., storage device(s) 202, storage device(s) 206, host 208, and host 210, etc.) of the storage system 200. The ID database 308 may store and/or organize the port ID of each port 302 and/or port 304 and/or the unique ID of each computing component or node of the storage system 200 using any suitable scheme that is known or developed in the future. Example storage and/or organizational schemes for the port IDs and/or unique IDs include, but are not limited to, a group/grouping of data, a sequence of data, a data table, a data chart, an index, a procedure, a routine, a view, a snapshot, and/or the like contents/classes of data.

A processor 310 may include any suitable processing hardware and/or software capable of performing computer processes, functions, and/or algorithms. In various embodiments, a processor 310 is configured to facilitate communication between computing components or nodes (e.g., storage device(s) 202, storage device(s) 206, host 208, and host 210, etc.) in the storage system 200 that utilize different communication protocols.

Figure 4A:
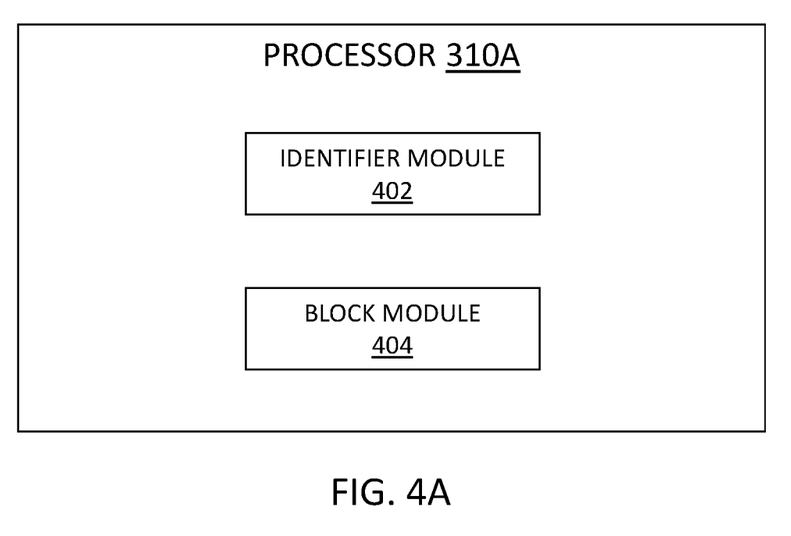
FIGS. 4A and 4B are block diagrams of various embodiments of a processor included in the concentrator of FIG. 3.

With reference to FIG. 4A, FIG. 4A is a block diagram of one embodiment of a processor 310A. At least in the illustrated embodiment, the processor 310A includes, among other components, an identifier module 402 and a block module 404.

An identifier (ID) module 402 may include any suitable hardware and/or software that can assign and/or associate an identifier (e.g., a unique ID and/or a port ID) to a computing component or node (e.g., storage device(s) 202, storage device(s) 206, host 208, and host 210, etc.) in the storage system 200. A unique ID and/or port ID may include any suitable computer-readable representation and/or identifier of a node and/or port. In various embodiments, a unique ID and/or port ID may include alphanumeric characters and/or other type(s) of characters recognizable by a computing device.

In some embodiments, an ID module 402 automatically assigns a unique ID to each computing component or node (e.g., storage device(s) 202, storage device(s) 206, host 208, and host 210, etc.) coupled to a port 302 or port 304. Each unique ID may be randomly selected or selected in accordance with and/or consistent with a predetermined order and/or sequence.

A unique ID, in various embodiments, may be automatically assigned by an ID module 402 to a node using one or more secured connections (e.g., a secured connections technique). In some embodiments, a secured connection includes/provides a connection that is encrypted by one or more security protocols to ensure the security of data flowing between two or more nodes.

A secured connection may utilize any type of encryption and/or encryption technique that is known or developed in the future. In various embodiments, a secured connection can prevent third parties from accessing data exchanged between two nodes, validate the unique ID and/or port ID of a nodes attempting to access and exchange the data, and can protect information and/or data from being viewed and/or altered by unknown nodes and/or entities.

In alternative embodiments, an ID module 402 receives each unique ID from a user (e.g., each unique ID is manually assigned by a user). A unique ID can be assigned by a user based on one or more access policies (e.g., a policy-based technique). That is, the access policy or policies associated with a particular unique ID can define which unique ID(s) assigned to one or more other nodes in the storage system 200 that the node assigned the particular unique ID can access and/or communicate with. In this manner, the storage system 200 may be configurable via assigning unique IDs (or port IDs), via access policies, and/or by modifying unique IDs and/or access policies associated with a unique ID.

In further alternative embodiments, an ID module 402 can automatically assign a unique ID to a subset of nodes and receive a unique ID from a user for another subset of nodes (e.g., manual assignment). Automatic assignment and/or manual assignment of a unique ID may be based on any suitable parameter including, for example, a type of node, a manufacturer of a node, and/or a type of communication protocol implemented by the node, etc., among other parameters that are possible and contemplated herein.

In some embodiments, the unique ID of a node may include and/or be associated with the port ID of the port (e.g., port 302 or port 304) to which a node is coupled. In additional or alternative embodiments, the unique ID of a node may be the port ID of the port (e.g., port 302 or port 304) to which a node is coupled.

The unique ID of a node, in various embodiments, is used exclusively within the storage system 200. That is, the unique ID and/or port ID assigned to and/or associated with a node does not remain with the node should the node be removed from the storage system 200. In other words, outside of the storage system 200, a node will be identified by something other than the unique ID and/or port ID used in the storage system 200.

In some embodiments, an ID module 402 automatically assigns a port ID to each port 302 and/or port 304. Each port ID may be randomly selected or selected in accordance with and/or consistent with a predetermined order and/or sequence.

A port ID, in various embodiments, may be automatically assigned by an ID module 402 to a node using one or more secured connections (e.g., a secured connections technique). In some embodiments, a secured connection includes/provides a connection that is encrypted by one or more security protocols to ensure the security of data flowing between two or more nodes.

A secured connection may utilize any type of encryption and/or encryption technique that is known or developed in the future. In various embodiments, a secured connection can prevent third parties from accessing data exchanged between two nodes via a port 302 or port 304, validate a node attempting to access and exchange the data via port ID, and can protect information and/or data from being viewed and/or altered by nodes and/or entities using unknown ports.

In alternative embodiments, an ID module 402 receives each port ID from a user (e.g., each port ID is manually assigned by a user). A port ID can be assigned by a user based on one or more access policies (e.g., a policy-based technique). That is, the access policy or policies associated with a particular port ID can define which unique ID(s) assigned to one or more other nodes in the storage system 200 that the node coupled to the port (e.g., port 302 or port 304) assigned the particular port ID can access and/or communicate with. In this manner, the storage system 200 may be configurable via assigning port IDs, via access policies, and/or by modifying port IDs and/or access policies associated with a port ID.

In further alternative embodiments, an ID module 402 can automatically assign a port ID to a subset of ports (e.g., port(s) 302, port(s) 304, or a subset including one or more ports 302 and/or one or more ports 304) and receive a port ID from a user for another subset of nodes (e.g., manual assignment of port(s) 302, port(s) 304, or a subset including one or more ports 302 and/or one or more ports 304). Automatic assignment and/or manual assignment of a port ID may be based on any suitable parameter including, for example, a type of port and/or a type of communication protocol implemented by and/or compatible with the port, etc., among other parameters that are possible and contemplated herein.

In various embodiments, an ID module 402 transmits the unique IDs to the memory device 306 for storage in the ID database 308. In additional or alternative embodiments, an ID module 402 transmits the port IDs to the memory device 306 for storage in the ID database 308. In further additional or alternative embodiments, an ID module 402 transmits the unique IDs and the port IDs to the memory device 306 for storage in the ID database 308.

A block module 404 may include any suitable hardware and/or software that can utilize a unique ID and/or a port ID, which can function as and/or be a unique ID for a node, to facilitate communication between nodes that implement and/or utilize different communication protocols. In various embodiments, a block module 404 can create and/or generate one or more block groups of nodes.

A block group of nodes may include any quantity of nodes (e.g., storage device(s) 202, storage device(s) 206, host 208, and host 210, etc.), which can be referred to as member nodes. A block group enables each member node within the block group to access and/or communicate with one another.

A block group can be created by grouping the unique ID and/or port ID of each member and granting access to one another via an access policy and/or communication policy. In various embodiments, non-member nodes are unable to access and/or communicate with any member of a block group.

A block module 404, in some embodiments, can modify a block group by adding one or more member nodes and/or deleting one or more member nodes from a block group. When modifying a block group, a block module 404 can perform the functions of a block change manager by notifying the member nodes that are hosts (e.g., a host 208, host 210, etc.). Here, the member node(s) that is/are a host can provide approval of the modification to the block module 404. Further, the host(s) in a block group can generate and/or keep a record of the previous configuration, generate and/or keep a record of the new configuration, and apply the new configuration to the block group.

In some embodiments, a block module 404 can assign sub-identifiers to a set of data blocks stored in a set of nodes (e.g., storage device 202 and/or storage device 206, etc.) of a block group. The sub-identifiers can be associated with a host (e.g., host 208, host 210, etc.) of the block group so that the host 208/210 can access the data block(s), while other nodes in the block group may be prevented from accessing the data block(s).

During operation, nodes coupled to a concentrator 212 can exchange their respective unique ID and/or port ID with the concentrator 212 (e.g., block module 404) when one or more nodes is/are attempting to gain access to (e.g., perform I/O operations (e.g., read operations, write operations, etc.)) and/or communicate with one or more other nodes coupled to the concentrator 212. A node is granted access to and/or allowed to communicate with another node in response to the concentrator 212 determining that each node is a member of the same block group.

Figure 4B:
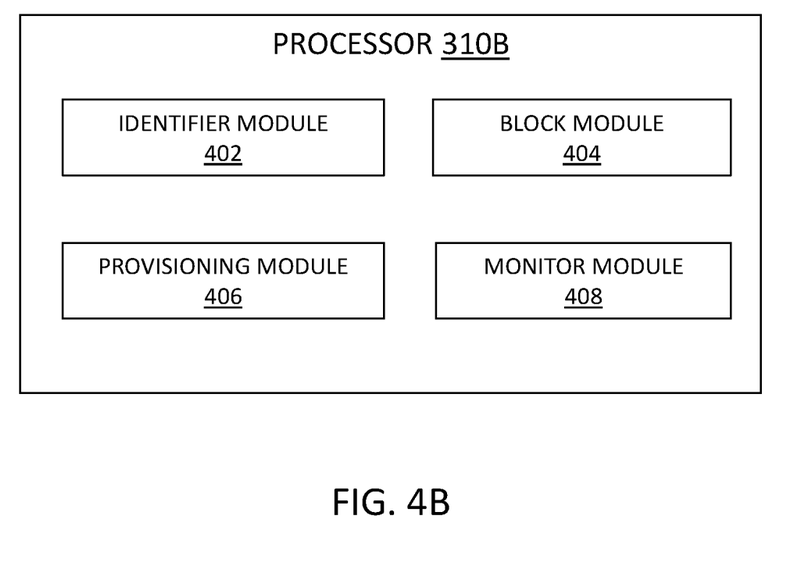

Referring to FIG. 4B, FIG. 4B is a block diagram of another embodiment of a processor 310B. At least in the illustrated embodiment, the processor 310B includes, among other components, an identifier module 402 and a block module 404 similar to the processor 310A discussed elsewhere herein. The processor 310B, in various embodiments, further includes a provisioning module 406 and a monitor module 408.

A provisioning module 406 may include any suitable hardware and/or software that can assign and/or manage data storage in the storage system 200. In various embodiments, the provisioning module 406 can assign data to be stored in locations in one or more storage devices 202 and/or in one or more storage devices 206.

The provisioning module 406 can select a storage location for data and/or a block of data based on a storage policy. The storage policy may be at least partially based on an access policy that determines which nodes can access the data and/or blocks of data, among other factors that are possible and contemplated herein. Further, the access policy may be based on the type of data, a source of the data (e.g., a particular client and/or client device 104, a target for the data (e.g., a particular client and/or client device 104), a security level for the data, and/or an importance level for the data, etc., among other factors that are possible and contemplated herein.

A monitor module 408 may include any suitable hardware and/or software that can monitor access and/or communication between nodes in the storage system 200. In various embodiments, the monitor module 408 can determine whether various transactions between nodes in the storage system 200 are secure transactions. That is, the monitor module 408 can determine whether a node accessing and/or communicating with another node in the storage system 200 are in the same block group.

In response to determining that a node accessing and/or communicating with another node in the storage system 200 are in the same block group, the monitor module 408 allows the nodes to continue accessing and/or communicating with one another. In response to determining that a node accessing and/or communicating with another node in the storage system 200 are not in the same block group, the monitor module 408 prevents the nodes from further accessing and/or communicating with one another. In this manner, transactions between nodes in the storage system 200 are secure.

Figure 5:
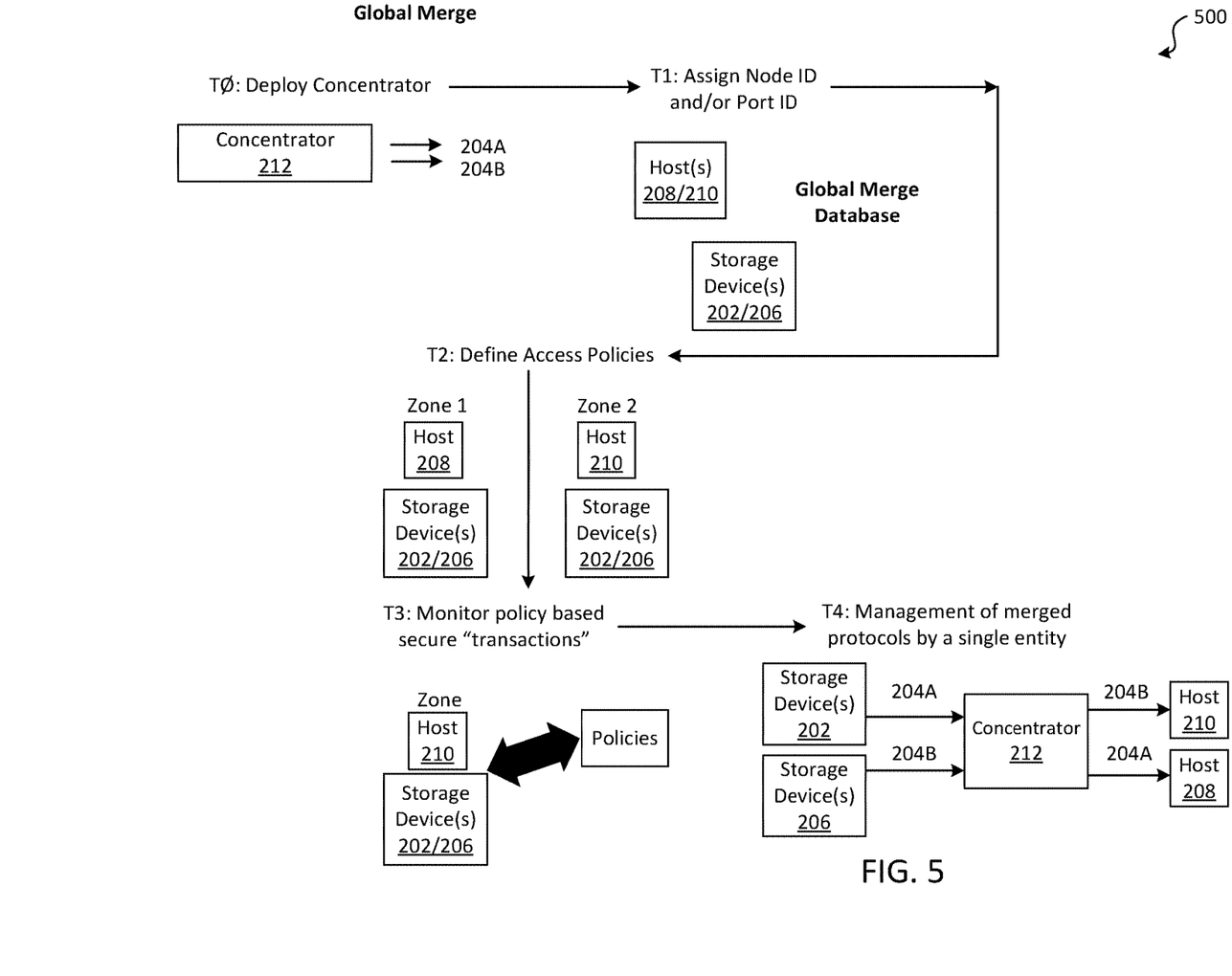
FIG. 5 is a timing diagram of the operations of one embodiment of the storage system of FIG. 2.

With reference to FIG. 5, FIG. 5 is a timing diagram 500 of one embodiment of operations of a storage system 200. At least in the illustrated embodiment, the operations begin at time T0 by deploying a concentrator (e.g., concentrator 212) that is capable of merging two or more different communication protocols. The two or more different communication protocols may be any of the communication protocols discussed elsewhere herein.

At time T1, a processor (e.g., processor 310A or processor 310B) can assign a node ID and/or a port ID to each node (e.g., storage device(s) 202, storage device(s) 206, host 208, and host 210, etc.) coupled to and/or in communication with the concentrator 212. The concentrator 212 (or processor 310A or processor 310B), at time T2, can define one or more access policies for the storage system 200. The access policies may include any of the access policies discussed elsewhere herein.

In some embodiments, the concentrator 212 (or processor 310A or processor 310B), at time T3, can monitor the access and/or communication between the various nodes of storage system 200 and allow or prevent access/communication between nodes based on whether they are in the same block group. At time T4, the concentrator 212 (or processor 310A or processor 310B) continues, as a single entity, to manage the operations of the storage system 200 throughout any quantity of transactions and/or amount of time.

Figure 6:
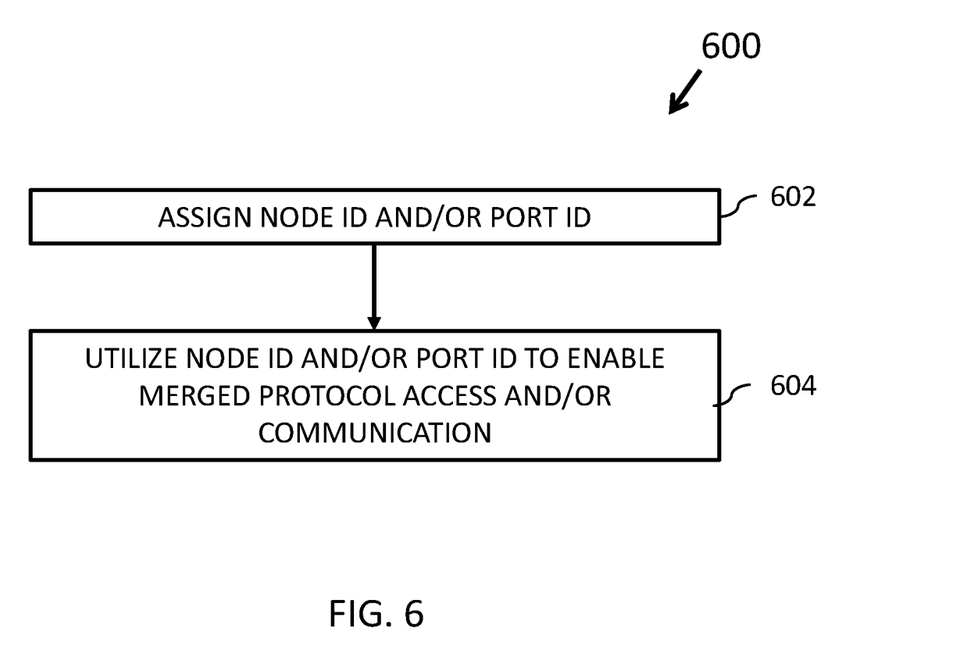
FIG. 6 is a schematic flow chart diagram illustrating one embodiment of a method for merging storage protocols in the storage system of FIG. 2.

Referring to FIG. 6, FIG. 6 is a schematic flow chart diagram illustrating one embodiment of a method 600 for merging storage protocols in a storage system (e.g., storage system 200). At least in the illustrated embodiment, the method 600 can begin by assigning an ID to one or more nodes (e.g., storage device(s) 202, storage device(s) 206, host 208, and host 210, etc.) in the storage system 200 (block 602). The ID may be a node ID and/or a port ID.

A processor and/or processing device (e.g., processor 310A or processor 310B) can assign the node ID and/or the port ID to the one or more nodes. Further, the processor 310A or processor 310B can utilize the node ID and/or port ID to enable merged protocol access and/or communication between the various nodes (block 604).

Figure 7:
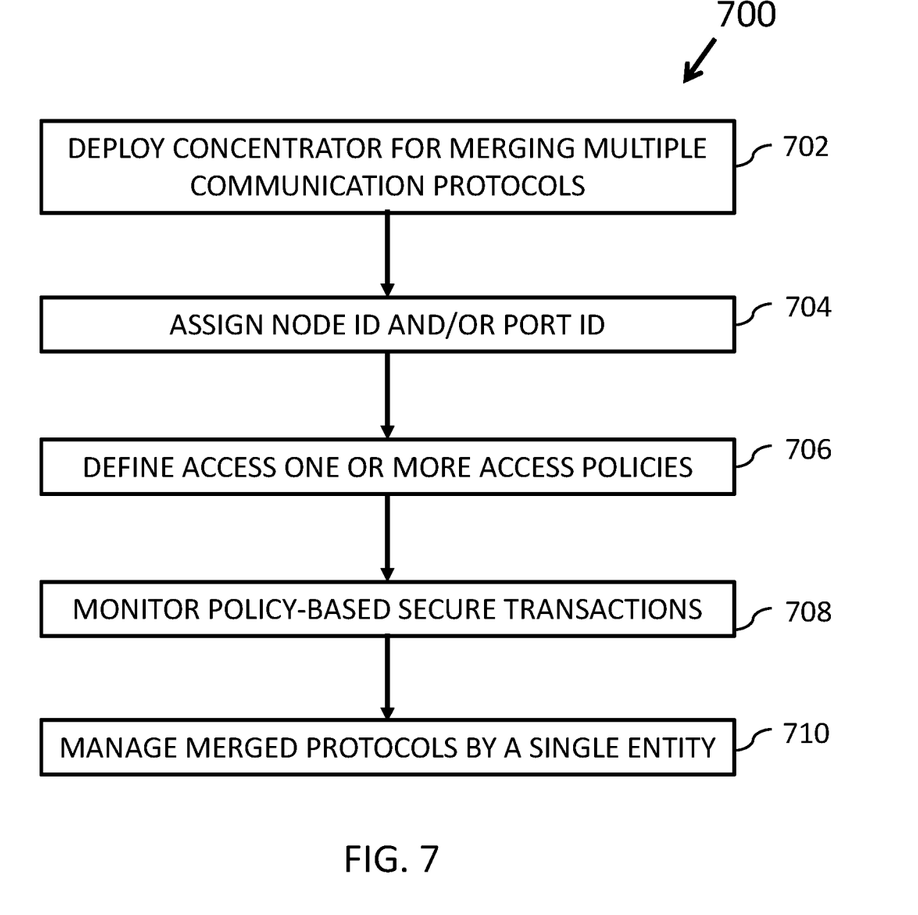
FIG. 7 is a schematic flow chart diagram illustrating another embodiment of a method for merging storage protocols in the storage system of FIG. 2.

With reference to FIG. 7, FIG. 7 is a schematic flow chart diagram illustrating another embodiment of a method 700 for merging storage protocols in a storage system (e.g., storage system 200). At least in the illustrated embodiment, the method 700 can begin by deploying a concentrator (e.g., concentrator 212) that is capable of merging multiple different communication protocols (block 702). The different communication protocols may be any of the communication protocols discussed elsewhere herein.

A processor (e.g., processor 310A or processor 310B) can assign a node ID and/or a port ID to each node (e.g., storage device(s) 202, storage device(s) 206, host 208, and host 210, etc.) coupled to and/or in communication with the concentrator 212 (block 704). The concentrator 212 (or processor 310A or processor 310B) can define one or more access policies for the storage system 200 (block 706). The access policies may include any of the access policies discussed elsewhere herein.

In some embodiments, the concentrator 212 (or processor 310A or processor 310B) can monitor the access and/or communication between the various nodes of storage system 200 and allow or prevent access/communication between nodes based on whether they are in the same block group (block 708). The concentrator 212 (or processor 310A or processor 310B) can continue, as a single entity, to manage the operations of the storage system 200 throughout any quantity of transactions and/or amount of time (block 710).

Figure 8:
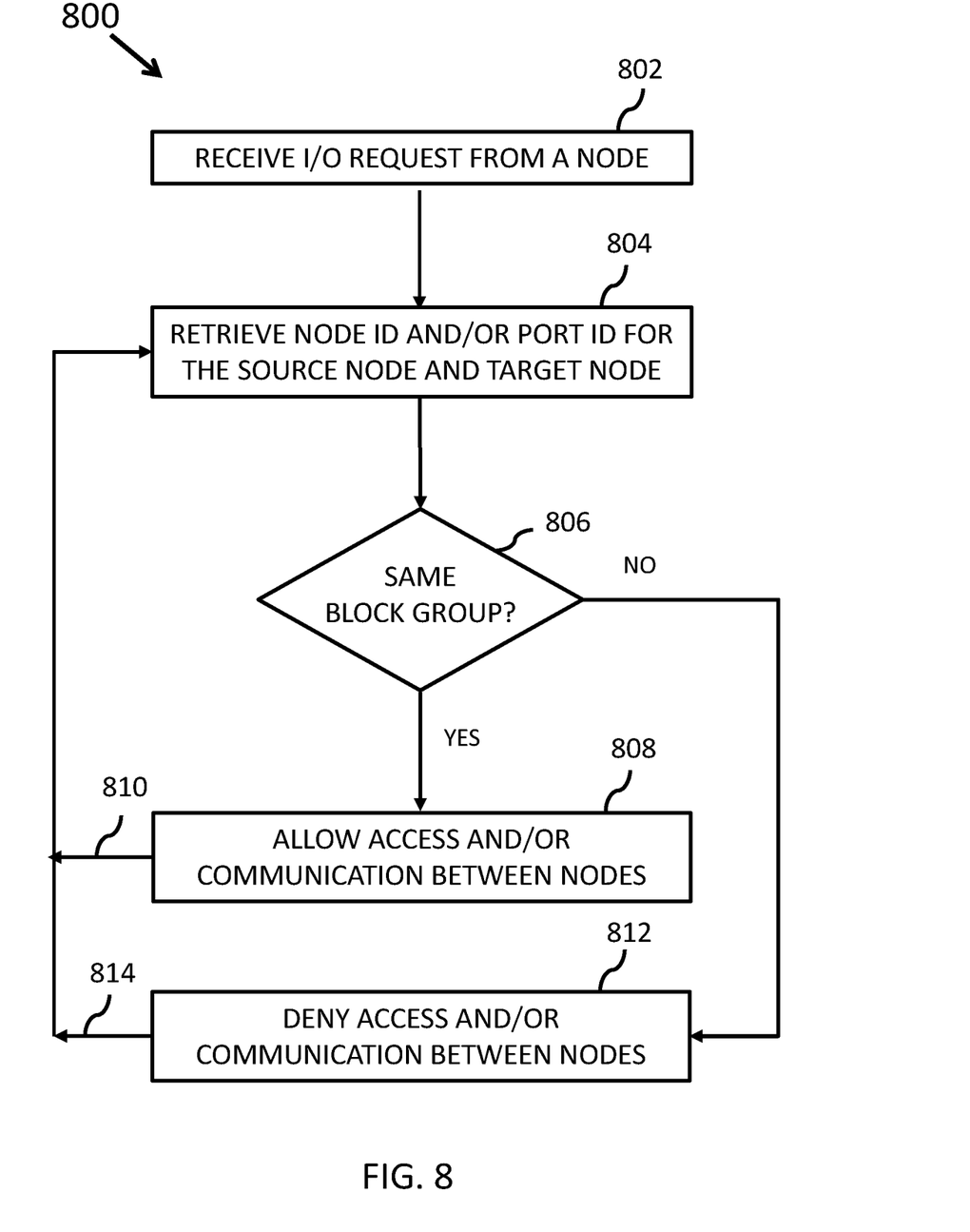
FIG. 8 is a schematic flow chart diagram illustrating one embodiment of yet another embodiment of a method for merging storage protocols in the storage system of FIG. 2.

Referring to FIG. 8, FIG. 8 is a schematic flow chart diagram illustrating yet another embodiment of a method 800 for merging storage protocols in a storage system (e.g., storage system 200). At least in the illustrated embodiment, the method 800 can begin by a concentrator (e.g., concentrator 212) receiving an I/O request from a node (e.g., storage device(s) 202, storage device(s) 206, host 208, and host 210, etc. (block 802).

In response thereto, the concentrator 212 can retrieve the node ID and/or port ID of each node (e.g., the source node, target node, etc.) subject to the I/O request (block 804). The concentrator 212 (e.g., via a monitor module 408) may then determine if the source node and the target node are members of the same block group (block 806).

In response to determining that the source node and the target node are members of the same block group (e.g., a "YES" in block 806), the concentrator can allow the source node and the target node to access/communicate and/or allow continued access/communication between the source node and the target node (block 808). The concentrator 212 can then be prepared to receive a subsequent I/O request from a node in the storage system 200 (return 810).

In response to determining that the source node and the target node are not members of the same block group (e.g., a "NO" in block 806), the concentrator can deny the source node from accessing/communicating with the target node and/or discontinue access/communication between the source node and the target node (block 812). The concentrator 212 can then be prepared to receive a subsequent I/O request from a node in the storage system 200 (return 814). The method 800 may then repeat for one or more additional iterations.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:

an identifier module that:
    assigns a unique identifier to each of a plurality of nodes in a storage network, and
    stores the unique identifier assigned to each of the plurality of nodes in an identifier database, wherein:
        a first node in the plurality of nodes is assigned a first unique identifier and utilizes a first storage protocol,
        a second node in the plurality of nodes is assigned a second unique identifier and utilizes a second storage protocol, and
        the first storage protocol and the second storage protocol are different storage protocols;
a block module that:
    groups a plurality of nodes to create a block group of nodes, the block group of nodes comprising at least the first node and the second node utilizing different storage protocols,
    utilizes the first unique identifier assigned to the first node and the second unique identifier assigned to the second node to enable the first node that utilizes the first storage protocol and the second node that utilizes the second storage protocol to communicate with each other by granting access to one another via an access policy utilizing the first unique identifier and the second unique identifier, and
    grants the access to one another via the first unique identifier and the second unique identifier in response to determining that the first node and the second node are grouped to the block group of nodes; and
a monitor module that:
    monitors access and communication between nodes within the storage network, and
    prevents nodes not grouped to the block group of nodes from accessing and communicating with the first node and the second node based on the nodes not grouped to the block group not including the first unique identifier and the second unique identifier,
wherein:
    the identifier module assigns the unique identifier to each of the plurality of nodes in the storage network as part of a secure connection technique,
    the secured connection technique provides an encrypted connection between each node in the block group of nodes that is encrypted with one or more security protocols to create a secure data exchange between each pair of nodes in the block group of nodes,
    the secure data exchange prevents third parties from accessing data in the block group of nodes by validating the unique ID of each node attempting to access or exchange the data in the block group of nodes,
    the identifier module performs one of:
        automatically assigning the first unique identifier to the first node without receiving input from a user,
        automatically assigning the second unique identifier to the second node without receiving input from the user, and
        automatically assigns the first unique identifier to the first node and automatically assigns the second unique identifier to the second node without receiving input from the user, and
    at least a portion of said modules comprise one or more of a set of hardware circuits, a set of programmable hardware devices, and executable code stored on a set of non-transitory computer-readable storage media.

2. The apparatus of claim 1, wherein the identifier module:
    automatically assigns the first unique identifier to the first node without receiving input from the user or automatically assigns the second unique identifier to the second node without receiving input from the user; and
    non-automatically assigns the other one of the first unique identifier to the first node and the second unique identifier to the second node in response to receiving input from the user.

3. The apparatus of claim 1, wherein the identifier module assigns the unique identifier to each of the first node and the second node via a block change technique.

4. The apparatus of claim 1, further comprising:
    an identifier database that stores a record of the unique identifier for each of the first node and the second node.

5. The apparatus of claim 4, wherein the identifier database is configured to:
    store the first unique identifier assigned by the identifier module to the first node that implements the first storage protocol; and
    store the second unique identifier assigned by the identifier module to the second node that implements the second storage protocol that is different from the first storage protocol.

6. The apparatus of claim 5, wherein:
    the first storage protocol comprises a Fibre Channel (FC) protocol; and
    the second storage protocol comprises an Internet Small Computer System Interface (iSCSI) protocol.

7. The apparatus of claim 6, wherein:
    the first unique identifier and the second unique identifier are used exclusively within the storage network and are independent of identifiers utilized with the FC protocol and the iSCSI protocol;
    the first unique identifier is not utilized outside of the storage network if the first node is removed from the storage network;
    the second unique identifier is not utilized outside of the storage network if the second node is removed from the storage network;
    the first node comprises an FC identifier for use with FC protocols outside of the storage network, the FC identifier and the first unique identifier are different identifiers; and
    the second node comprises an iSCSI identifier for use with iSCSI protocols outside of the storage network, the iSCSI identifier and the second unique identifier are different identifiers.

8. A system, comprising:
a plurality of nodes, wherein:
    a first node is assigned a first unique identifier and utilizes a first storage protocol,
    a second node in the plurality of nodes is assigned a second unique identifier and utilizes a second storage protocol, and
    the first storage protocol and the second storage protocol are different storage protocols; and a concentrator coupled to each of the plurality of nodes, the concentrator comprising:
an identifier module that:
assigns the first unique identifier to the first node and the second unique identifier to the second node, and
stores at least the first unique identifier and the second unique identifier in an identifier database,
a block module that:
groups a plurality of nodes to create a block group of nodes, the block group of nodes comprising at least the first node and the second node utilizing different storage protocols, and
utilizes the first unique identifier of the first node and the unique identifier of the second node to enable the first node that utilizes the first storage protocol and the second node utilizing the second storage protocol to communicate with each other by granting access to one another via an access policy utilizing the first unique identifier and the second unique identifier, and
grants the access to one another via the first unique identifier and the second unique identifier in response to determining that the first node and the second node are grouped to the block group of nodes, and
a monitor module that:
monitors access and communication between nodes within the storage network, and
prevents nodes not grouped to the block group of nodes from accessing and communicating with the first node and the second node based on the nodes not grouped to the block group not including the first unique identifier and the second unique identifier,
wherein:
the identifier module assigns the unique identifier to each of the plurality of nodes in the storage network as part of a secure connection technique,
the secured connection technique provides an encrypted connection between each node in the block group of nodes that is encrypted with one or more security protocols to create a secure data exchange between each pair of nodes in the block group of nodes,
the secure data exchange prevents third parties from accessing data in the block group of nodes by validating the unique ID of each node attempting to access or exchange the data in the block group of nodes, and
the identifier module is configured to perform one of:
automatically assigning the first unique identifier to the first node without receiving input from a user,
automatically assigning the second unique identifier to the second node without receiving input from the user, and
automatically assigns the first unique identifier to the first node and automatically assigns the second unique identifier to the second node without receiving input from the user.

9. The system of claim 8, wherein:
the first storage protocol for the first node comprises a Fibre Channel (FC) protocol;
the second storage protocol for the second node comprises an Internet Small Computer System Interface (iSCSI) protocol; and the block module facilitates communication between the first node and the second node via a first unique identifier assigned to the first node and a second unique identifier assigned to the second node.

10. The system of claim 9, wherein:
the first unique identifier and the second unique identifier are used exclusively within the storage network and are independent of identifiers utilized with the FC protocol and the iSCSI protocol;
the first unique identifier is not utilized outside of the storage network if the first node is removed from the system;
the second unique identifier is not utilized outside of the storage network if the second node is removed from the system;
the first node comprises an FC identifier for use with FC protocols outside of the storage network, the FC identifier and the first unique identifier are different identifiers; and
the second node comprises an iSCSI identifier for use with iSCSI protocols outside of the storage network, the iSCSI identifier and the second unique identifier are different identifiers.

11. The system of claim 8, wherein the identifier module further assigns the first unique identifier to the first node and the second unique identifier to the second node utilizing one of:
a policy-based technique; and
a block change technique.

12. The system of claim 8, wherein the identifier module further assigns the first unique identifier to the first node and the second unique identifier to the second node utilizing a block change technique.

13. The system of claim 8, further comprising:
an identifier database that stores a record of the first unique identifier assigned to the first node and the second unique identifier assigned to the second node.

14. The system of claim 13, wherein:
the first storage protocol comprises a Fibre Channel (FC) protocol; and
the second storage protocol comprises an Internet Small Computer System Interface (iSCSI) protocol.

15. A method, comprising:
assigning, by a processor, a unique identifier to each of a plurality of nodes in a storage network;
storing the unique identifier assigned to each of the plurality of nodes in an identifier database, wherein:
a first node in the plurality of nodes is assigned a first unique identifier and utilizes a first storage protocol,
a second node in the plurality of nodes is assigned a second unique identifier and utilizes a second storage protocol, and
the first storage protocol and the second storage protocol are different storage protocols; and
grouping a plurality of nodes to create a block group of nodes, the block group of nodes comprising at least the first node and the second node utilizing different storage protocols; and
utilizing the first unique identifier assigned to the first node and the second unique identifier assigned to the second node to enable the first node utilizing the first storage protocol and the second node utilizing the second storage protocol to communicate with each other by granting access to one another via an access policy utilizing the first unique identifier and the second unique identifier;

granting the access to one another via the first unique identifier and the second unique identifier in response to determining that the first node and the second node are grouped to the block group of nodes;

monitoring access and communication between nodes within the storage network; and preventing nodes not grouped to the block group of nodes from accessing and communicating with the first node and the second node based on the nodes not grouped to the block group not including the first unique identifier and the second unique identifier, wherein:

the processor assigns the unique identifier to each of the plurality of nodes in the storage network as part of a secure connection technique, the secured connection technique provides an encrypted connection between each node in the block group of nodes that is encrypted with one or more security protocols to create a secure data exchange between each pair of nodes in the block group of nodes, the secure data exchange prevents third parties from accessing data in the block group of nodes by validating the unique ID of each node attempting to access or exchange the data in the block group of nodes, and the processor is configured to performs one of:

automatically assigning the first unique identifier to the first node without receiving input from a user, automatically assigning the second unique identifier to the second node without receiving input from the user, and automatically assigns the first unique identifier to the first node and automatically assigns the second unique identifier to the second node without receiving input from the user.

16. The method of claim 15, wherein:

the first storage protocol for the first node comprises a Fibre Channel (FC) protocol; and the second storage protocol for the second node comprises an Internet Small Computer System Interface (iSCSI) protocol.

17. The method of claim 16, wherein:

the first unique identifier and the second unique identifier are used exclusively within the storage network and are independent of identifiers utilized with the FC protocol and the iSCSI protocol;

the first unique identifier is not utilized outside of the storage network if the first node is removed from the system;

the second unique identifier is not utilized outside of the storage network if the second node is removed from the system;

the first node comprises an FC identifier for use with FC protocols outside of the storage network, the FC identifier and the first unique identifier are different identifiers; and the second node comprises an iSCSI identifier for use with iSCSI protocols outside of the storage network, the iSCSI identifier and the second unique identifier are different identifiers.

18. The method of claim 15, wherein assigning the first unique identifier to the first node and the second unique identifier to the second node further comprises utilizing one of:

a policy-based technique; and a secure connection technique.

19. The method of claim 15, wherein assigning the first unique identifier to the first node and the second unique identifier to the second node further comprises utilizing a block change technique.

20. The method of claim 15, further comprising:

storing a record of the first unique identifier assigned to the first node and the second unique identifier assigned to the second node in an identifier database, wherein:

the first storage protocol comprises a Fibre Channel (FC) protocol, and the second storage protocol comprises an Internet Small Computer System Interface (iSCSI) protocol.

* * * * *